(12) United States Patent
Fowkes

(10) Patent No.: US 10,711,919 B2
(45) Date of Patent: Jul. 14, 2020

(54) REPAIRING OR COATING SUBSEA PIPELINES

(71) Applicant: Subsea 7 Limited, Sutton (GB)

(72) Inventor: Michael John Fowkes, Banchory (GB)

(73) Assignee: Subsea 7 Limited, Sutton (GB)

( * ) Notice: Subject to any disclaimer, the term of this patent is extended or adjusted under 35 U.S.C. 154(b) by 0 days.

(21) Appl. No.: 15/764,839

(22) PCT Filed: Sep. 20, 2016

(86) PCT No.: PCT/GB2016/052931
§ 371 (c)(1),
(2) Date: Mar. 29, 2018

(87) PCT Pub. No.: WO2017/055809
PCT Pub. Date: Apr. 6, 2017

(65) Prior Publication Data
US 2018/0274697 A1    Sep. 27, 2018

(30) Foreign Application Priority Data

Oct. 2, 2015   (GB) .................................. 1517472.5

(51) Int. Cl.
*F16L 13/02*    (2006.01)
*F16L 58/18*    (2006.01)
(Continued)

(52) U.S. Cl.
CPC ............ *F16L 1/265* (2013.01); *B29C 63/024* (2013.01); *B29C 63/10* (2013.01); *F16L 1/26* (2013.01);
(Continued)

(58) Field of Classification Search
CPC ....... F16L 1/265; F16L 58/16; F16L 55/1686; F16L 1/26; F16L 58/181; F16L 13/0272; B29C 63/10; B29C 63/024; B29K 2063/00
(Continued)

(56) References Cited

U.S. PATENT DOCUMENTS

| | | | | |
|---|---|---|---|---|
| RE17,675 E | * | 5/1930 | Christopher ........... | B65H 81/08 242/447.3 |
| 1,883,401 A | * | 10/1932 | Rolfs ..................... | B65H 81/08 242/441.3 |

(Continued)

FOREIGN PATENT DOCUMENTS

| | | |
|---|---|---|
| CN | 202322161 | 7/2012 |
| EP | 2 600 051 | 6/2013 |

(Continued)

*Primary Examiner* — Benjamin F Fiorello
*Assistant Examiner* — Edwin J Toledo-Duran
(74) *Attorney, Agent, or Firm* — Levy & Grandinetti

(57) ABSTRACT

A wrap tape cassette for a subsea pipeline repair or coating machine includes a drum for carrying a wrap tape wound on the drum. A housing defines an exit opening for the wrap tape to be dispensed from the drum onto a pipeline during a repair or coating operation. The drum may be mounted to the housing for rotational and longitudinal movement relative to the housing to dispense the wrap tape through the exit opening on being unwound from the drum. A leading end of the wrap tape may be attached to an anchor element that is arranged as a closure for the exit opening and, when moved from the exit opening, for attachment to a pipeline being repaired or coated.

44 Claims, 6 Drawing Sheets

(51) Int. Cl.
*F16L 55/16* (2006.01)
*B29C 63/02* (2006.01)
*F16L 1/26* (2006.01)
*F16L 55/168* (2006.01)
*B29C 63/10* (2006.01)
*F16L 58/16* (2006.01)
*B29K 63/00* (2006.01)

(52) U.S. Cl.
CPC ....... *F16L 13/0272* (2013.01); *F16L 55/1686* (2013.01); *F16L 58/16* (2013.01); *F16L 58/181* (2013.01); *B29K 2063/00* (2013.01)

(58) Field of Classification Search
USPC ............................................. 405/184.1–184.3
See application file for complete search history.

(56) References Cited

U.S. PATENT DOCUMENTS

| | | | | |
|---|---|---|---|---|
| 1,961,974 | A * | 6/1934 | Kraner | C23F 13/02 138/143 |
| 2,070,196 | A * | 2/1937 | Black | B65H 75/38 137/341 |
| 2,722,019 | A * | 11/1955 | Brock | B63B 22/06 441/26 |
| 2,863,204 | A * | 12/1958 | Timothy | B29C 48/151 156/188 |
| 2,924,546 | A | 2/1960 | Shaw | |
| 2,949,853 | A * | 8/1960 | Vogt | F42B 8/28 102/407 |
| 3,403,869 | A | 10/1968 | Marchisen et al. | |
| 3,473,338 | A * | 10/1969 | Pearce | B63B 19/08 405/188 |
| 3,595,045 | A * | 7/1971 | Fuqua | B21C 9/00 72/39 |
| 4,058,427 | A | 11/1977 | Wilson | |
| 4,105,887 | A * | 8/1978 | Marshall | B23K 9/0061 219/72 |
| 4,145,014 | A * | 3/1979 | Chatard | E21B 19/22 242/390.9 |
| 4,228,399 | A * | 10/1980 | Rizzo | G01R 19/10 324/425 |
| 4,673,363 | A * | 6/1987 | Hudson | B29C 49/20 264/516 |
| 5,491,880 | A * | 2/1996 | Labiche | B29C 63/10 156/282 |
| 5,585,143 | A * | 12/1996 | Scharf | B05B 9/002 427/224 |
| 5,950,953 | A * | 9/1999 | Baugh | B65H 75/4402 242/157.1 |
| 7,455,257 | B1 * | 11/2008 | Kaleta | B63C 11/02 242/397.3 |
| 8,567,450 | B2 * | 10/2013 | Sringfellow | B29C 63/343 138/104 |
| 10,093,522 | B1 * | 10/2018 | Baugh | B66D 1/36 |
| 2001/0023882 | A1 * | 9/2001 | Gilkes | B65H 35/0026 225/26 |
| 2004/0129373 | A1 * | 7/2004 | Nadarajah | F16L 55/168 156/94 |
| 2005/0276665 | A1 * | 12/2005 | Entralgo | B63C 11/42 405/190 |
| 2006/0174957 | A1 * | 8/2006 | Blackmore | E03F 3/06 138/98 |
| 2008/0217921 | A1 * | 9/2008 | Raftery | F03B 13/1885 290/53 |
| 2011/0097157 | A1 * | 4/2011 | Swiatowy | B23C 3/007 405/184.1 |
| 2012/0048152 | A1 * | 3/2012 | Kim | B66D 1/39 108/20 |
| 2013/0160925 | A1 | 6/2013 | De Jong | |
| 2013/0279988 | A1 * | 10/2013 | Al-Buraik | F17D 5/02 405/127 |
| 2013/0300069 | A1 * | 11/2013 | Chang | B63H 23/321 277/550 |

FOREIGN PATENT DOCUMENTS

| | | | |
|---|---|---|---|
| EP | 2600051 B1 * | 2/2019 | ................ F16L 1/26 |
| ES | 2 373 600 | 2/2012 | |
| GB | 2 446 506 | 8/2008 | |
| WO | WO 92/05383 | 4/1992 | |
| WO | WO 02/11972 | 2/2002 | |
| WO | WO 2007/143559 | 12/2007 | |
| WO | WO 2011/049668 | 4/2011 | |
| WO | WO 2013/182831 | 12/2013 | |
| WO | WO 2015/059673 | 4/2015 | |
| WO | WO 2015/086694 | 6/2015 | |

\* cited by examiner

REPAIRING OR COATING SUBSEA PIPELINES

This invention relates to the repair or coating of subsea pipelines. Thus, the invention addresses the challenging problems of repairing or protecting pipelines underwater, especially where remote operation is necessary at depths that preclude diver intervention.

The invention can be used not only to repair the surface of a pipeline but also to repair or protect a pipeline in a broader sense, such as by coating or re-coating the pipeline. Coating may take place after total or partial removal of a previous coating, for example by grinding off the previous coating. In that case, the invention can replace a previous coating layer on the outer surface of the pipeline. The invention can also be used to complete the coverage of a coating, for example around a discontinuity on a pipeline such as a flange or a connector.

It is straightforward and conventional to repair an onshore pipeline by applying a patch or a tape over a defect in the surface or the coating of the pipeline. The patch or tape is simply bonded to the surface or the coating as the case may be, which allows a repair to be made without cutting the pipeline. For example, U.S. Pat. No. 2,924,546 describes bonding a fabric tape around a pipe.

Machines have been developed to automate the repair of onshore pipelines. An example is disclosed in WO 92/05383, in which a support frame is clamped to an onshore pipeline. Moving parts of the machine wrap a tape around the pipeline at an angle relative to the transverse direction defined by the diameter of the pipeline. Similarly, WO 2011/049668 describes a machine for wrapping lengths of tape helically around an onshore pipeline. The tape is applied by a head that is supported to move around the pipeline. US 2013/160925 describes an apparatus which winds a continuous strip of material around a pipe surface to form a spiral sleeve that is spaced from the pipe surface. Other examples of devices for wrapping tape around pipelines may be found in GB 2446506, WO 2015/086694 and U.S. Pat. No. 4,058,427.

WO 2015/059673 discloses a machine for applying protective sheeting around a field joint of a subsea pipeline. This is not a subsea repair process but instead is done during fabrication of the pipeline and hence before the pipeline is launched into the sea. The sheeting is formed by a polymer tape or film that is unspooled from a reel carried by the machine or that is extruded and pressed onto the surface of the pipeline by an arrangement of rollers. A bonding agent or the polymer tape or film is then hardened by cooling down after heating, by curing using added chemical agents, by a curing reaction with water or by exposure to infrared or UV radiation, depending upon the type of polymer.

Conventional solutions such as those outlined above are well known but are not suitable for use underwater, especially in deep water. Onshore technologies are impractical for subsea use because hardening has to be achieved in a cold, wet environment under great hydrostatic pressure. Additionally, in anything other than shallow water, subsea pipeline repair has to be effected by remote operation rather than by diver intervention, such as by using remotely operated vehicles (ROVs).

WO 2013/182831 proposes a pipeline repair machine that is said to be suitable for use underwater and for operation by an ROV. The machine comprises a support frame that is clamped to a subsea pipeline. A reel of tape is carried by a mechanism that is displaced relative to the support frame to wrap the tape around the pipeline. The frame is then removed. Finally, a polymer pre-impregnated in the wrapped tape is cured by exposure to UV radiation or by heating.

WO 2013/182831 contains no teaching of how to solve the hardening problem by overcoming the challenges of heating the tape underwater or of exposing the tape to UV radiation underwater. Also, the machine disclosed in WO 2013/182831 is not suitable for ROV operation, noting that the first turn of tape must be parallel to the diameter of the pipeline to fix the tape, before subsequent turns are done at an angle to its diameter. This would be feasible only if the machine disclosed in WO 2013/182831 is controlled by divers.

ES 2373600 describes a device, for subsea repairs of pipelines, which is mounted around a pipe and comprises a drum for unwinding a sheet of material around the pipe, and a roller which presses the sheet onto the pipe.

Against this background, the invention resides in a wrap tape cassette for a subsea pipeline repair or coating machine. The cassette comprises: a drum for carrying a wrap tape wound on the drum; and a housing defining an exit opening for the wrap tape to be dispensed from the drum onto a pipeline during a repair or coating operation. The drum is mounted to the housing for rotational movement relative to the housing to dispense the wrap tape through the exit opening on being unwound from the drum.

Also a leading end of the wrap tape is attached to an anchor element that is arranged as a closure for the exit opening and, when moved from the exit opening, for attachment to a pipeline being repaired or coated.

The drum may be mounted to the housing also for longitudinal movement relative to the housing. Preferably, the drum is reciprocally movable longitudinally relative to the housing. In that case, at least one sensor may be provided for sensing a limiting longitudinal position of the drum relative to the housing and for generating a reversal signal to reverse the direction of longitudinal movement.

The or each sensor may, for example, be mounted to the housing to detect contact with, or proximity of, a part of the drum. It is also possible for at least one sensor to sense a limiting position of the wrap tape, which is equivalent to the fleeting or momentary angle of the tape and to the relative position of the drum and the housing, to generate a reversal signal to reverse the direction of longitudinal movement.

Rotary and/or longitudinal drives suitably act between the housing and the drum. The or each drive may be contained within the housing or may extend through a wall of the housing. In a specific example to be described, the drum may be rotatably mounted on a carriage that is movable longitudinally within the housing. In that case, a driven pinion mounted on the carriage may be engaged with a rack extending longitudinally along the housing.

The anchor element is preferably removably mounted to the housing and may be magnetically attachable to the pipeline. For the purpose of attachment to the pipeline, the anchor element suitably has a concave-curved outer face.

Where the housing surrounds the drum in a watertight enclosure, a watertight closure may be arranged to close the exit opening. The anchor element may serve as that watertight closure.

The housing may support a wrap initiation mechanism positioned to act on the anchor element to move the anchor element away from the housing. The wrap initiation mechanism suitably comprises one or more actuators, each having an extensible rod that bears on the anchor element to move the anchor element. There may be a pivoting interface between the anchor element and the or each rod.

The inventive concept extends to a subsea pipeline repair or coating machine comprising, or arranged to be fitted with, a cassette of the invention. Such a cassette may be removable from or integrated with the machine.

The machine of the invention preferably comprises a mount for attachment to a pipeline and a cassette drive acting between the mount and the housing of the cassette. The cassette drive is operable to move the cassette relative to the pipeline during a repair or coating operation while wrap tape is being dispensed from the drum of the cassette onto the pipeline.

The cassette drive suitably comprises a rotary drive arranged to turn the cassette around the pipeline and a linear drive arranged to move the cassette along the pipeline. The linear drive is preferably oriented relative to the mount to extend parallel to the pipeline and is movable on a circular path around the mount.

A control system acting on the cassette drive is preferably configured to synchronise and control movement of the cassette around and along the pipeline. The control system may be configured also to synchronise and control movement of the drum of the cassette relative to the housing.

The inventive concept also finds expression in corresponding methods of repairing or coating a subsea pipeline. One such method involves unwinding a wrap tape from a drum to dispense the wrap tape onto the pipeline while effecting rotational movement of the drum relative to a housing of the drum. Preferably, the method also comprises effecting longitudinal or longitudinal and reciprocal movement of the drum relative to the housing of the drum. The method may comprise sensing a limiting longitudinal position of the drum or of the exiting tape relative to the housing.

The housing can also be moved relative to the pipeline while dispensing the wrap tape onto the pipeline, by turning the housing around the pipeline and/or by moving the housing along the pipeline. Movement of the housing relative to the pipeline is suitably controlled and synchronised with movement of the drum relative to the housing.

Application of the wrap tape is preferably initiated by attaching an anchor element to the pipeline. A leading end of the wrap tape attached to the anchor element is thereby anchored to the pipeline. The anchor element may serve as a closure for an exit opening of the housing before being moved from the housing to the pipeline.

For example, the anchor element is conveniently pushed from the housing toward the pipeline.

Advantageously, the drum may be held dry in a watertight housing to keep the wrap tape dry before a repair or coating operation. On initiating a repair or coating operation, the housing may be opened to flood the housing with water to start curing a water-curable polymer on the wrap tape.

The methods of the invention may be preceded by fitting the housing and drum to a pipeline repair or coating machine while the machine is underwater. The machine may be replenished with wrap tape by interchanging the housing and drum, preferably while the machine remains underwater.

In summary, therefore, the invention resides in a cassette for a subsea pipeline repair or coating machine. The invention also resides in a subsea pipeline repair machine using such a cassette, which may be integrated with the machine but is preferably removable from the machine to be interchangeable, and in related methods for repairing or coating a subsea pipeline.

In a preferred embodiment, the cassette comprises a mount for connection to a repair machine and a housing that supports a motor driving a rotatable shaft. A drum is mounted on the shaft, which drum carries a repair tape and optionally one or more additional wrap elements. The housing has a window through which the repair tape and any additional wrap elements pass in use. The drum is able to rotate and be axially displaced along the shaft inside the housing so that the angle of the repair tape and any additional wrap elements passing through the window is controlled. The invention therefore provides for reciprocal displacement of a rotating drum relative to a cassette housing while the cassette also moves around the pipeline.

The housing may be watertight and a flap may leak-tightly close the window before and optionally after a repair is performed. This may, for example, be desirable where the repair tape is pre-impregnated with a water-curable polymer.

The motor may be inside or outside the housing of the cassette. In the latter case, the shaft may traverse a wall of the housing.

The additional wrap elements may be one or more products inserted between layers of the repair tape, such as electric wire, optical fibre, a reinforcing layer, or a carbon fibre layer. Carbon fibre may serve not just as a reinforcement but also for heating to effect curing of a heat-curable wrap tape.

More specifically, the cassette may comprise an inner wrap drum, an outer housing, a reciprocating device, a back-tension device and a spooling device. The outer housing suitably houses or supports inner drum bearings, a drive mechanism and a reciprocating mechanism acting on the inner wrap drum, together with spooling guides and optionally also a wrap initiation mechanism.

The outer housing may be resistant to hydrostatic pressure if the wrap or repair tape is required to have a water-activated epoxy. Ideally, in that case, the outer housing may be resistant to the hydrostatic pressure of deep water, enabling use of the invention in a water depth of 1000 m or 2000 m by way of example.

The wrap initiation mechanism supported by the housing is arranged to connect a first end of the repair tape to the pipeline. For example, the repair tape may be attached to the pipeline by a magnetic element on which the wrap initiation mechanism acts. The magnetic element, or other element attachable to the pipeline to anchor the repair tape, may be displaceable from the housing to the pipeline by one or more actuators such as hydraulic jacks.

The flap may be a seal plate or other closure for effecting a seal at the interface between the flap and the housing surrounding the window. The seal plate can be moved relative to the housing, for example detached from the housing, upon opening the window. Elegantly, a seal plate may also be used as an element that is attachable to the pipeline to anchor the repair tape, on which element the wrap initiation mechanism acts. A movable seal plate can therefore have more than one function, namely flooding the cassette for activating a water-crosslinkable epoxy bond in the repair tape and for attaching the tape to the pipeline for initiation of wrapping.

Sensors such as limit switches may detect when the angle of the repair tape through the window exceeds a threshold, and/or when the inner wrap drum reaches a limit position within the outer housing.

In a preferred method, the inventive concept finds expression in a subsea pipeline repair method that involves wrapping a repair tape and optionally one or more additional wrap elements around a pipeline. The method comprises: mounting a pipeline repair machine on the pipeline; attaching a first end of the repair tape to the pipeline; unspooling the tape from a cassette mounted on the machine while wrapping the tape around the pipeline; and simultaneously limiting the angle of the tape relative to a transverse direction by controlling alignment of a tape-carrying drum of the cassette with a window of the cassette and by controlling the rotational velocity of the drum. Optionally, attaching a first end of the repair tape to the pipeline may be preceded by opening a flap or other closure of the cassette that closes the window.

In order that the invention may be more readily understood, reference will now be made, by way of example, to the accompanying drawings in which.

Figure 1:
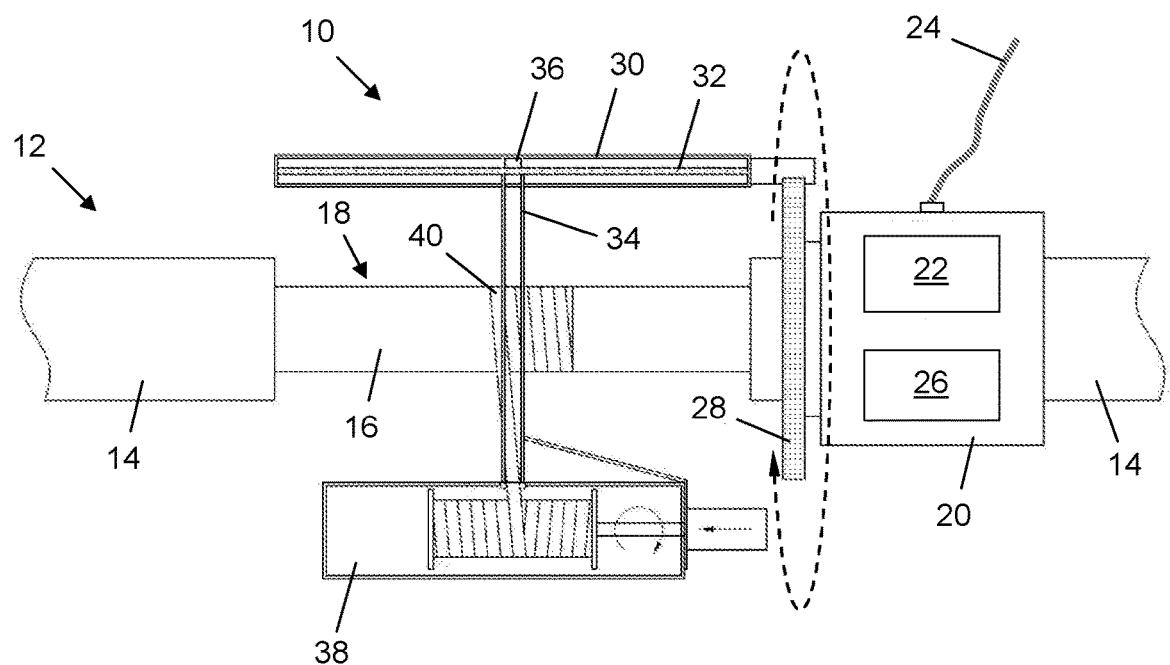
FIG. 1 is a schematic side view of a pipe-wrapping machine in accordance with the invention, in use while applying a wrap to a subsea pipeline.

Referring firstly to FIG. 1, a machine 10 for applying an epoxy wrap to a subsea pipeline 12 is shown mounted to the pipeline 12 at a subsea worksite. The pipeline 12 has a polymer coating 14 for corrosion protection and optionally also for thermal insulation, which coating 14 has been cut away from the underlying steel pipe 16 along a repair length 18.

The machine 10 comprises a mount 20 that surrounds and is clamped to a coated portion of the pipeline 12 beside, but longitudinally offset from, the repair length 18. The mount 20 may, for example, be attached to the pipeline 12 by sets of clamps within the mount 20 that are sized or shimmed to suit the outer diameter of the pipeline 12.

Depending on the application, the machine 10 can be deployed from the surface to the worksite using a crane or winch or may be fitted with suitable buoyancy and flown to the worksite using an ROV, optionally after being deployed to depth in a basket. Manoeuvring the machine 10 by ROV intervention in this way is well suited to operations in ultra-deep water or in other challenging situations, for example where the machine 10 has to be manipulated into a confined space or onto delicate pipework.

It is also possible for the clamp sets to be operable independently as a pair and movable parallel to the pipeline 12 to walk the machine 10 along the pipeline 12. This allows the machine 10 to position itself accurately beside the repair length 18 and to move between different locations on the pipeline 12 to perform multiple successive repair operations if required.

The mount 20 comprises a valve pack and control pod shown schematically at 22, which may be controlled via an umbilical 24 from a robust laptop computer linked to an ROV control van at an above-surface location. The valve pack and control pod 22 controls hydraulic, electric, electronic and signal functions of the machine 10.

The mount 20 further comprises a motor and gearbox unit shown together schematically at 26, which drives a lead screw drive 28 to turn around the pipeline 12 relative to the mount 20. The motor and gearbox unit 26 is conveniently powered electrically or hydraulically via the umbilical 24.

The lead screw drive 28 supports a lead screw housing 30 to turn circumferentially around the repair length 18 as the lead screw drive 28 turns around the pipeline 12. The lead screw housing 30 contains a lead screw 32 that extends parallel to the pipeline 12 and is rotatably mounted within the lead screw housing 30.

A frame 34 supported by the lead screw housing 30 is driven for longitudinal movement relative to the lead screw housing 30 by a lead screw follower 36 engaged with the lead screw 32. The frame 34 supports a wrap cassette 38 to turn with the lead screw housing 30 around the pipeline 12. In so doing, the wrap cassette 38 applies an epoxy wrap tape 40 to the pipe 16 from which the coating 14 has been cut away along the repair length 18.

For ease of illustration, the wrap cassette 38 is shown in FIG. 1 opposed to the lead screw housing 30 about the pipeline 12. However, the wrap cassette 38 could instead be positioned beside the lead screw housing 30. Also, the lead screw housing 30 need not be cantilevered from the lead screw drive 28 as shown in FIG. 1 but could instead be supported at both ends for rotation around the pipeline 12.

Preferably the wrap cassette 38 is removably attachable to the frame 34 so that wrap cassettes 38 may be interchanged when it is necessary to resupply the machine 10 with wrap tape 40. A wrap cassette 38 may be mounted on the machine 10 before lowering the machine 10 into the water or may be mounted on the machine underwater. In that latter case, a wrap cassette 38 can be replaced by an ROV or, if the water is shallow enough, by a diver.

Rotation of the lead screw 32 within the lead screw housing 30 moves the lead screw follower 36, and hence the frame 34 and the wrap cassette 38, longitudinally relative to the lead screw housing 30, parallel to the pipeline 12. The wrap cassette 38 applies the wrap tape 40 to the pipe 16 in successive abutting aligned helical coils by virtue of simultaneous longitudinal movement of the wrap cassette 38 along the pipeline 12 and rotation of the wrap cassette 38 around the pipeline 12.

The length of the lead screw 32 must be sufficient for the wrap cassette 38 to traverse far enough longitudinally to effect the required repair of the pipeline 12. In this example, the lead screw 32 extends the full length of the repair length 18 where the coating 14 has been cut away from the underlying pipe 16.

Rotation of the lead screw 32 is reversible to change the direction of longitudinal movement of the wrap cassette 38 relative to the pipeline 12. For example, the wrap cassette 38 must change direction when the wrap tape 40 reaches the end of the exposed pipe 16 from which the coating 14 has been cut away.

The speed and direction of rotation of the lead screw 32 may be controlled by the motor and gearbox unit 26 acting on the lead screw drive 28, but could instead be driven by a dedicated motor supported by the lead screw housing 30.

Reversing the longitudinal motion of the wrap cassette 38 at each end of the repair length 18 allows the machine 10 to build up successive layers of helically-wound wrap tape 40. A layered structure comprising wound layers 42 of wrap tape 40 on the pipe 16 is shown schematically in FIG. 2. By way of example, up to thirty layers of wrap tape 40 may be applied by the machine 10.

Figure 2:
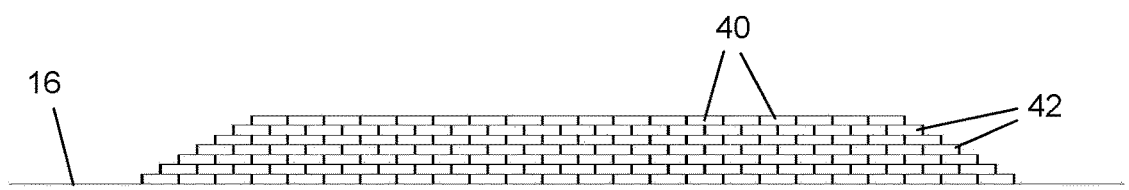
FIG. 2 is a schematic sectional view through layers of a wrap applied to a subsea pipeline by the pipe-wrapping machine shown in FIG. 1.
Figure 3:
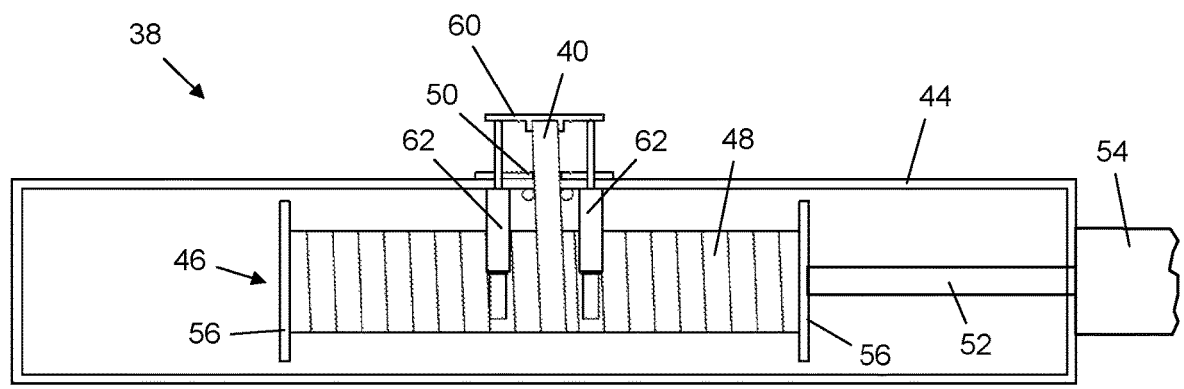
FIG. 3 is a schematic part-sectioned view through a wrap cassette of the pipe-wrapping machine shown in FIG. 1, also showing a seal plate that is cooperable with a housing of the wrap cassette; a wrap tape attached to the seal plate; and a pair of actuator rods that bear against the seal plate to push the seal plate away from the housing.

The windings of wrap tape 40 in each layer 42 suitably overlap the windings of wrap tape 40 in the layer 42 below. FIG. 2 shows an overlap of 50% between windings of neighbouring layers 42 but other degrees of overlap are possible, such as 75%. The required wrap overlap is determined by the outer diameter of the pipeline 12 and the width of the wrap tape 40. That wrap overlap is achieved by adjusting the speed of rotational movement of the wrap cassette 38 around the pipeline 12 relative to the speed of longitudinal movement of the wrap cassette 38 along the pipeline 12 and the rate of feed of the wrap tape 40 from the wrap cassette 38.

Figure 4:
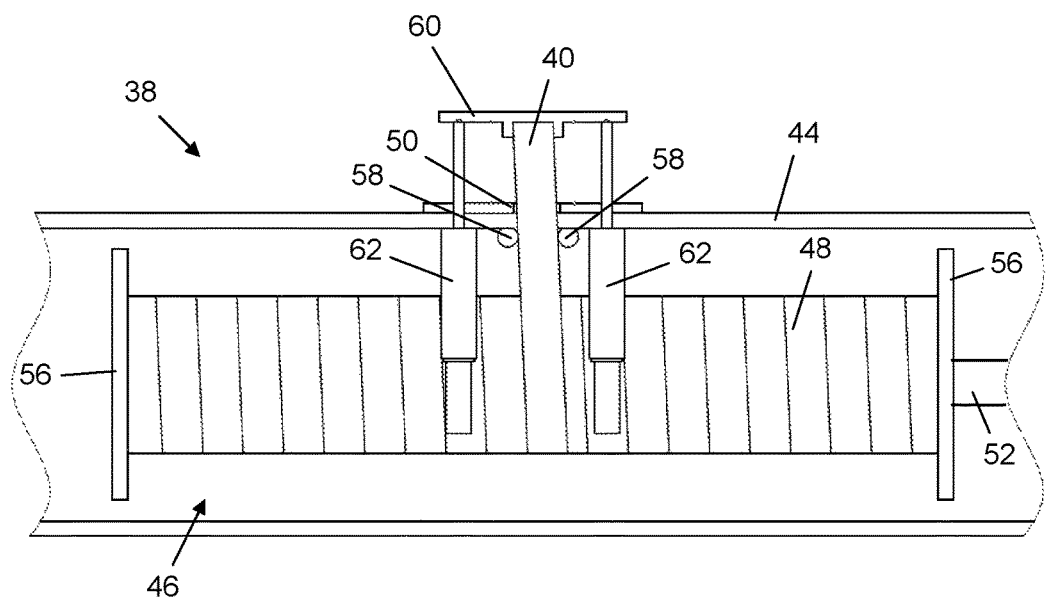
FIG. 4 is an enlarged detail view of a wrap drum within the housing of the wrap cassette of FIG. 3.
Figure 5:
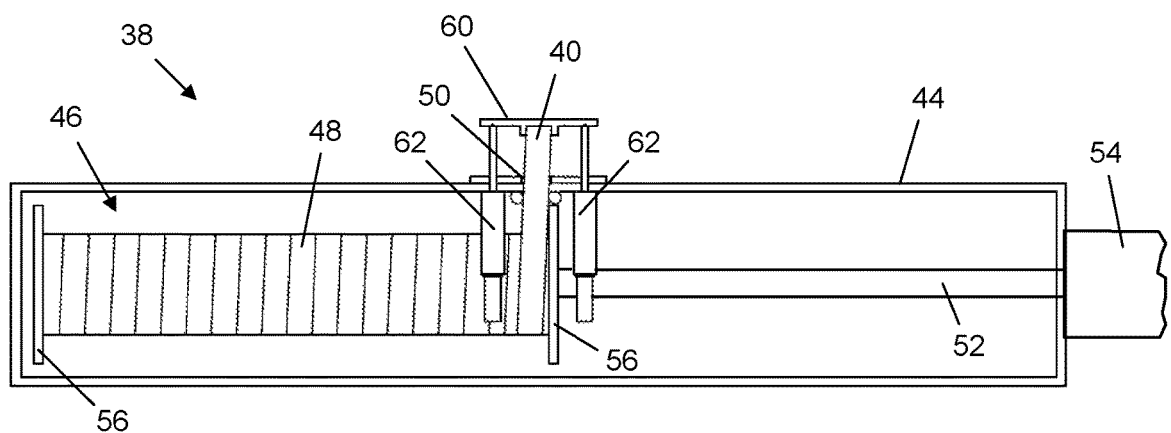
FIGS. 5 and 6 are schematic part-sectioned views corresponding to FIG. 3, but showing the wrap drum at respective extremes of longitudinal movement within the housing of the wrap cassette.
Figure 6:
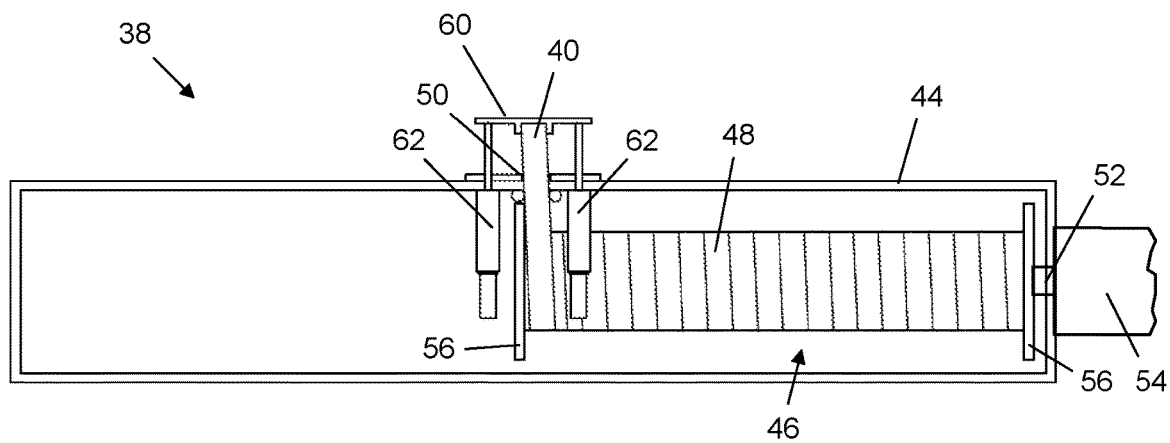

Turning next to FIGS. 3 to 6, these drawings show features of the wrap cassette 38 in more detail. They show that the wrap cassette 38 comprises an elongate outer housing 44 containing an elongate inner wrap drum 46. The inner drum 46 holds the entire length of wrap tape 40 necessary to make a layered repair wrap around the pipe 16. Successive overlapping layers 48 of the wrap tape 40 may be wound helically on the inner drum 46 at the same angle or at opposing angles as shown in FIG. 5.

During a repair operation, the wrap tape 40 unwinds from the inner drum 46, exits the outer housing 44 via an opening 50 half-way along the outer housing 44 and is applied to the pipe 16 under tension. Thus, back tension is applied to the inner drum 46 to ensure uniform layering of the wrap tape 40 around the pipe 16. Back tension is maintained in the wrap tape 40 throughout the repair operation. The opening 50 remains aligned with the point of application of the wrap tape 40 to the pipe 16 throughout.

As the opening 50 defining the exit from the wrap cassette 38 is fixed, spooling of the wrap tape 40 is accommodated by the inner drum 46 sliding or rolling back and forth within the outer housing 44. Specifically, the inner drum 46 is about half of the length of the outer housing 44. The inner drum 46 can be moved longitudinally along the outer housing 44 while being turned about its longitudinal axis within the outer housing 44. In this embodiment, these longitudinal and rotational movements of the inner drum 46 are effected by an extensible rod 52 within the outer housing 44, driven by an actuator/motor 54 on the outer housing 44.

By virtue of its helical winding around the inner drum 46, the departure point of the wrap tape 40 from the inner drum 46 progresses along the inner drum 46 from one end to the other before reversing and returning to the opposite end as the next layer 48 unwinds. Nevertheless, reciprocal longitudinal movement of the inner drum 46 within the outer housing 44, synchronised with the progress of unwinding as the inner drum 44 turns, ensures that the wrap tape 40 continues to unwind from the inner drum 46 in alignment with the opening 50.

The speed of rotation of the inner drum 46 is also controlled to take account of the speed of rotation of the wrap cassette 38 around the pipeline 12, the progressive increase of radius of the wrap tape 40 on the pipe 16 by virtue of the accumulating layers 42, and the progressive reduction of radius of the wrap tape 40 on the inner drum 46 as layers 48 are unwound. The wrap tape 40 is preferably applied onto the pipe 16 at a constant speed but to achieve this, the speed of rotation of the inner drum 46 must increase steadily during the wrapping process. Software controlling the valve pack and control pod 22 controls reciprocation of the inner drum 46 as its speed of rotation increases during unspooling of the wrap tape 40. The same even, constant back tension should be maintained in the wrap tape 40 from the start to the end of the wrapping process irrespective of changes in the speed of rotation of the inner drum 46.

As best seen in the enlarged view of FIG. 4, the ends of the inner drum 44 have flanges 56 that interact with limit switches 58 to determine the range of longitudinal travel of the inner drum 46 within the outer housing 44. When triggered by proximity of, or contact with, a flange 56, the limit switches 58 reverse the direction of longitudinal movement of the inner drum 46.

A closure 60 attached to the outer housing 44, for example by magnetism, closes the opening 50. Hydraulic cylinders 62 within the outer housing 44 are oriented to push the closure 60 away from the outer housing 44 so as to open the opening 50.

A leading end of the wrap tape 40 is attached to the closure 60. This enables the closure 60 to initiate wrapping by attaching to the pipe 16, which in turn anchors the wrap tape 40 to the pipe 16.

Figure 7:
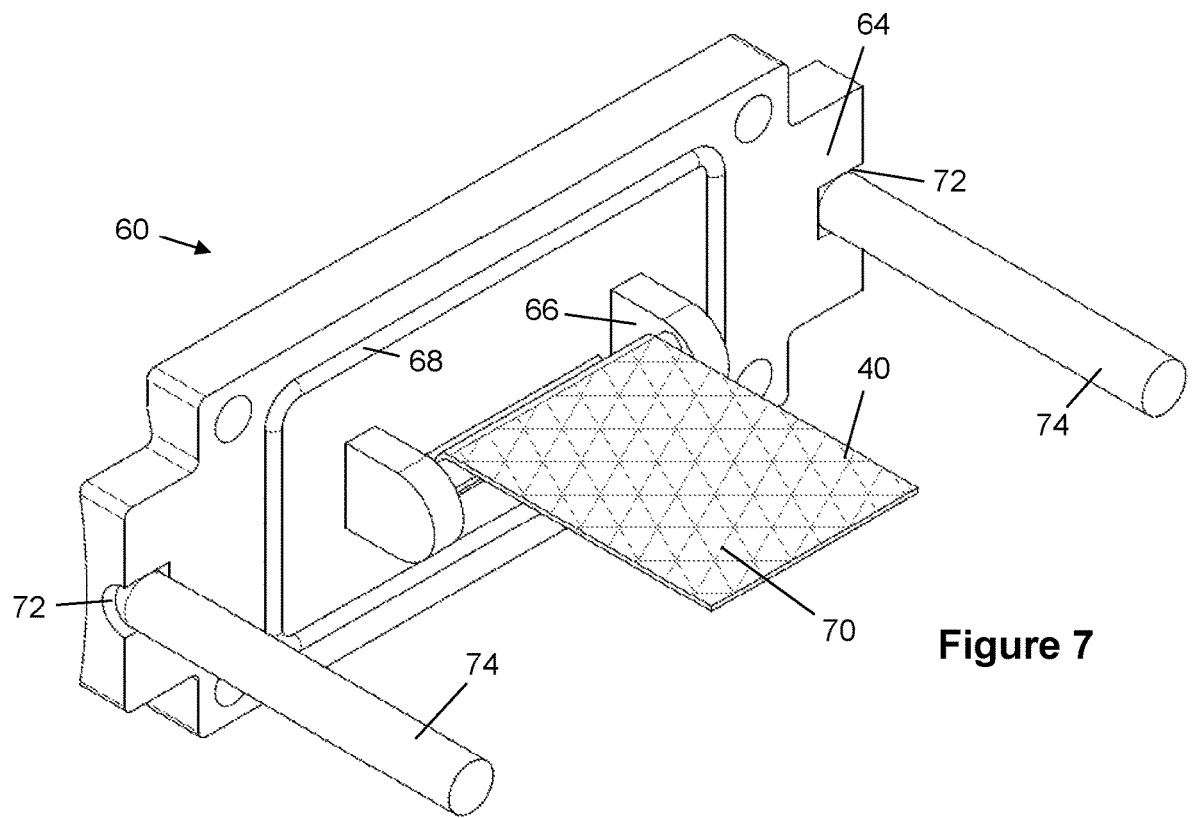
FIG. 7 is a schematic detail perspective view of the seal plate shown in FIGS. 3 to 6, this view also showing the actuator rods bearing against the seal plate, and a portion of the wrap tape held by a tensioner attached to the seal plate.

FIG. 7 is an enlarged view of the inner face 64 of the closure 60. The wrap tape 40 is attached to the inner face 64 by a tensioner 66. The tensioner 66 is surrounded by a seal 68 that seals against the outer housing 44 when the closure 60 is on the outer housing 44. The seal 68 then surrounds the opening 50 in the outer housing 44 so that the closure 60 effectively closes the opening 50.

FIG. 7 shows that the wrap tape 40 may include additional wrap elements 70 such as layers or fibres. It is also possible for the wrap tape 40 to be wound around the inner drum 46 beside additional wrap elements 70, to be unwound with them. Such additional wrap elements 70 may be: reinforcing or heating elements of, for example, carbon fibre; data carriers or sensors such as fibre-optic cables; and/or other heating elements such as electric resistance heating wires that may be activated to promote curing of the wrap tape. Any additional wrap elements 70 are conveniently wrapped onto the inner drum 46 simultaneously or in parallel with the wrap tape 40, during the same loading process.

The inner face 64 of the closure 60 further comprises a pair of sockets 72 that receive the free ends of rods 74 of the hydraulic cylinders 62. The rods 74 have rounded ends and the sockets 72 are complementarily rounded to permit relative angular movement between the closure 60 and the rods 74, as shown in FIG. 8.

Figure 8:
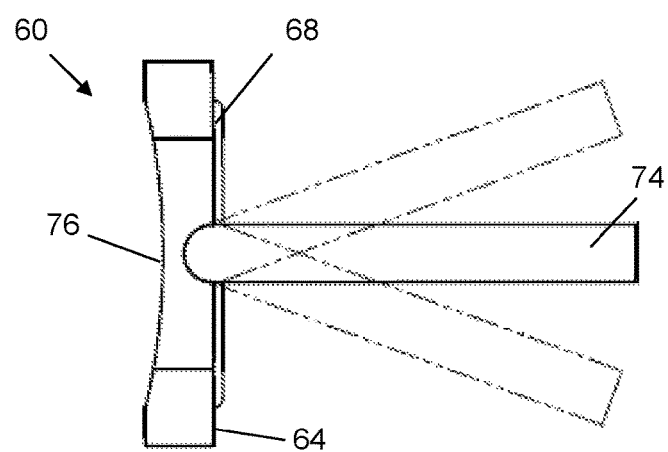
FIG. 8 is a schematic side view of the seal plate of FIG. 7, showing a potential range of relative angular movement between the seal plate and the actuator rods.

FIG. 8 also shows that the outer face 76 of the closure 60 has concave part-cylindrical curvature to complement the convex external curvature of the pipe 16. The purpose of this curvature is apparent from FIGS. 9a to 9c, which show the wrap cassette 38 in cross-section beside the pipe 16 during a wrap initiation procedure.

Briefly, to anchor an end of the wrap tape 40 to the pipe 16 to initiate a repair, the closure 60 attached to the end of the wrap tape 40 is magnetic to serve as an anchor plate. A wrap-initiating mechanism deploys the closure 60 against the pipe 16. The closure 60 then holds itself magnetically to the steel wall of the pipe 16. Once attached to the pipe 16 in this way, the wrap-initiating mechanism disengages from the closure 60 to allow application of the wrap tape 40 to the pipe 16 to commence.

Optionally, as will be described, the closure 60 also serves as a seal plate for the outer housing 44. Thus, as the wrap-initiating mechanism performs the attachment or anchoring operation described above, removal of the closure 60 from the outer housing 44 allows the wrap cassette 38 to flood with seawater 78. This activates epoxy components of the wrap tape 40, initiating curing and hence hardening.

Figure 9A:
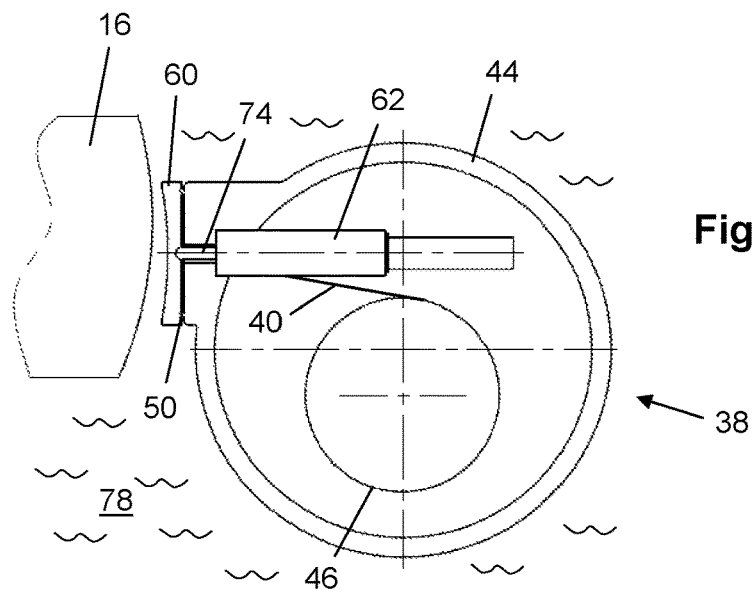
FIGS. 9a, 9b and 9c are a series of side views showing, in sequence, the initiation of a wrapping operation in accordance with the invention by extending the actuator rods to separate the seal plate of FIGS. 7 and 8 from the housing and to apply the seal plate to the pipeline, thus anchoring an end of the attached wrap tape to the pipeline.
Figure 9B:
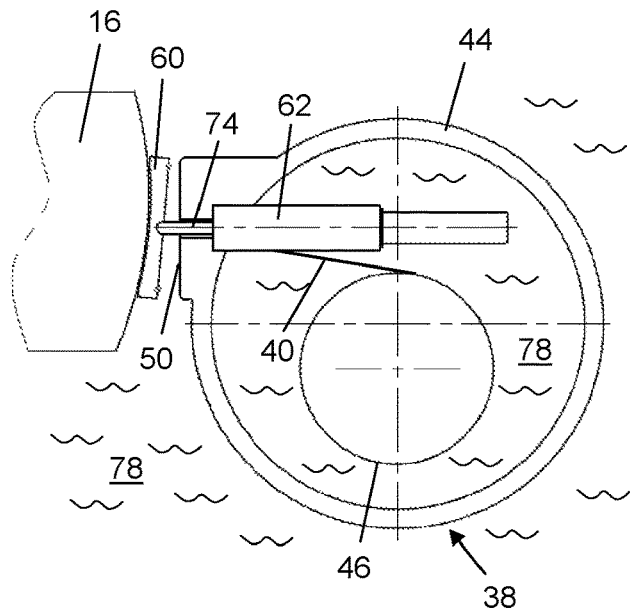
Figure 9C:
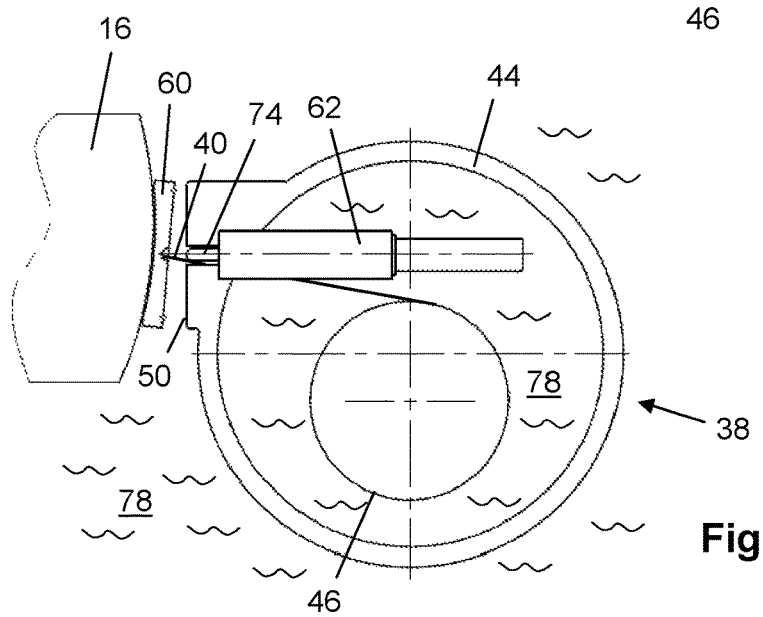

The positions of the outer housing 44, the inner drum 46, the opening 50, the closure 60 and the hydraulic cylinders 62 are all evident in FIGS. 9a to 9c. It is also evident that the wrap tape 40 extends from the inner drum 46 to the closure 60. In this example, the wrap tape 40 is cured by exposure to seawater 78 and so must be kept dry until it is ready to be applied to the pipe 16.

FIG. 9a shows the closure 60 closing the opening 50 and sealing against the outer housing 44 of the wrap cassette 38. This keeps the surrounding seawater 78 out of the wrap cassette 38 and so keeps the wrap tape 40 dry. The rams 74 of the hydraulic cylinders 62 are kept retracted at this stage.

FIG. 9b shows the rams 74 of the hydraulic cylinders 62 being extended to dislodge the closure 60 from the outer housing 44 and to press the closure 60 against the pipe 16. The closure 60 is permitted to tilt relative to the rods 74 of the hydraulic cylinders 62 by virtue of the rounded interfaces of the rods 74 with the sockets 72. Tilting allows the closure 60 to match the local inclination of the pipe 16. Tilting may also help the closure 60 to move against the opposing hydrostatic pressure of the surrounding seawater 78 and to break the seal between the closure 60 and the outer housing 44. The result is that the interior of the outer housing 44 quickly floods with seawater 78, which immerses the wrap tape 40 to start curing.

FIG. 9c shows the rams 74 of the hydraulic cylinders 62 retracted away from the closure 60. Magnetic attraction between the closure 60 and the pipe 16 holds the closure 60 on the pipe 16. The closure 60 thereby serves as an initiation anchor for subsequent deployment of the now-curing wrap tape 40 when the wrap cassette 38 starts to turn around the pipe 16.

Figure 10:
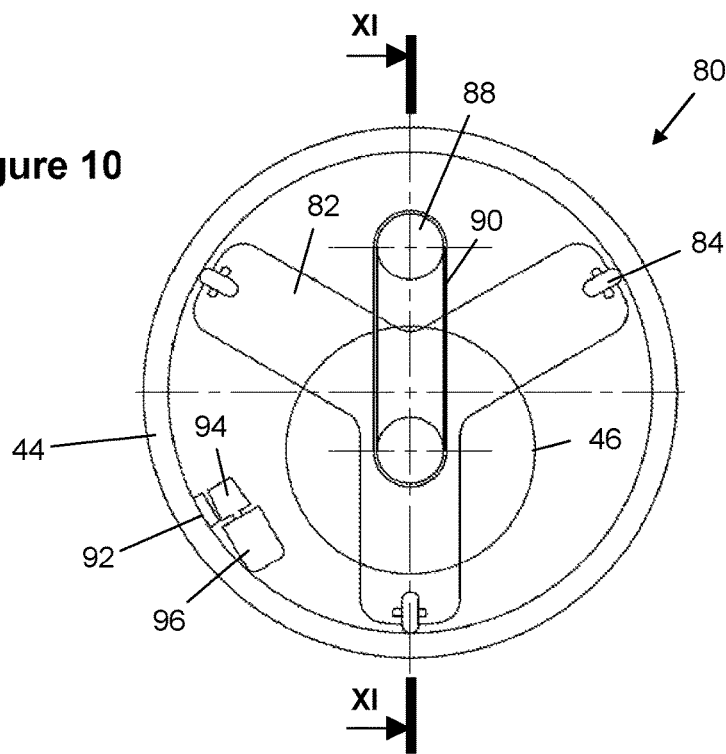
FIG. 10 is a schematic cross-sectional view through the housing of the wrap cassette, showing another way of supporting the wrap drum for both rotary movement and longitudinal movement within the housing.
Figure 11:
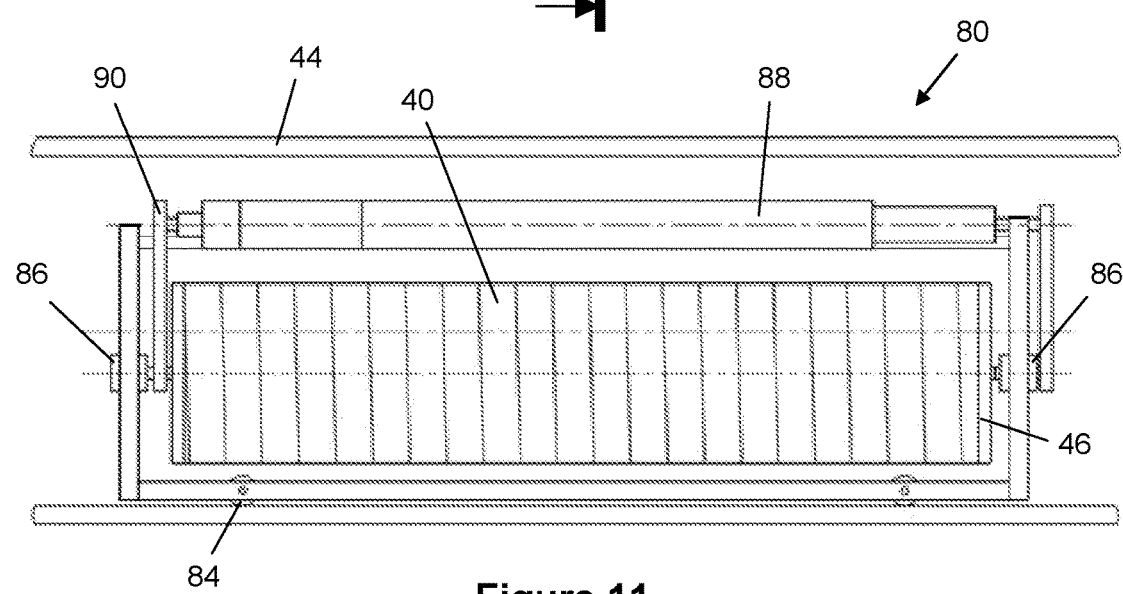
FIG. 11 is a schematic part-sectional view on line XI-XI of FIG. 10.
Figure 12:
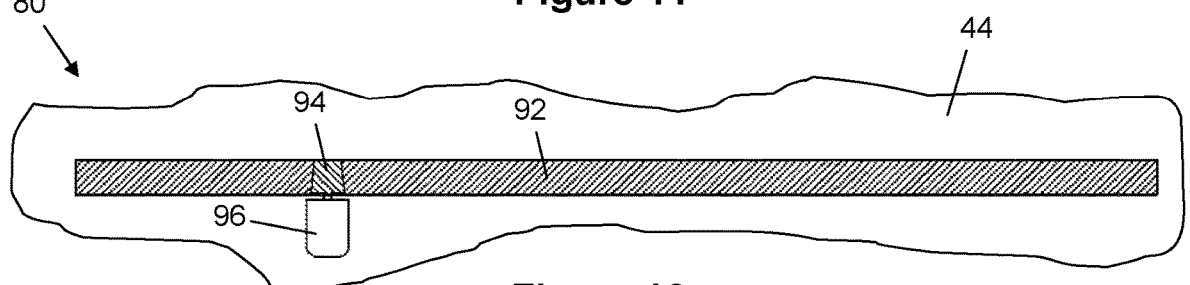
FIG. 12 is a schematic detail side view of a rack-and-pinion mechanism that is also visible in the cross-sectional view of FIG. 10, for driving longitudinal movement of the wrap drum within the housing of the wrap cassette.

Turning finally to FIGS. 10 to 12, these show a variant 80 of the wrap cassette 38. Like numerals are used for like parts. In particular, FIGS. 10 and 11 show that the wrap cassette 80 comprises a tubular outer housing 44 with closed ends. An inner drum 46 can move longitudinally within the outer housing 44 as the inner drum 46 turns about its longitudinal axis. This pays out a wrap tape 40 layered on the inner drum 46.

The wrap cassette 80 differs from the wrap cassette 38 in how the inner drum 46 is moved longitudinally and turned relative to the outer housing 44. In this example, the inner drum 46 is supported by a carriage 82 equipped with wheels 84 that can roll along the interior of the outer housing 44. Bearings 86 at both ends of the inner drum 46 allow the inner drum 46 to turn relative to the carriage 82. This rotation of the inner drum 46 is driven by an elongate motor/gearbox unit 88 extending parallel to and disposed beside the inner drum 46. The motor/gearbox unit 88 is coupled to the inner drum 46 by a drive belt 90.

Longitudinal movement of the carriage 82 and hence of the inner drum 46 within the outer housing 44 is driven by a rack-and-pinion mechanism shown schematically in FIGS. 11 and 12. A toothed rack 92 extends along the interior of the outer housing 44 and is engaged by a pinion 94 driven by a motor 96 that is supported by the carriage 80.

In both variants, the wrap cassette 38, 80 enables a multiple-layer repair to be undertaken using one continuous length of wrap tape 40. The wrap cassette 38, 80 is designed to accommodate the continuous length of wrap tape 40 and to house the wrap tape 40 in a watertight environment, if the wrap tape 40 is water-activated. Optionally the wrap cassette 38, 80 can house additional fibre-optic cable wrapped alongside the wrap tape 40. If the wrap tape 40 is heat-activated, the wrap cassette 38, 80 can house additional heating elements such as wire cable wrapped alongside the wrap tape 40. Preferably the wrap cassette 38, 80 is capable of maintaining a back tension of say 10 kg to 12 kg on the wrap tape 40.

Many variations are possible within the inventive concept. For example, a machine of the invention could control itself to perform pre-programmed actions with a degree of autonomy. Control signals and/or power could be provided to a machine of the invention in different ways, for example via on-board batteries or by wired or wireless connection to an adjacent or tethered ROV.

In principle, machines of the invention are capable of handling, or may be configured or designed to suit, pipes with outer diameters from 4" to 44" (about 10 cm to 110 cm) and various repair lengths, inclinations and bends.

The invention claimed is:

1. A wrap tape cassette for a subsea pipeline repair or coating machine, the cassette comprising:
    a wrap tape;
    a drum for carrying the wrap tape wound on the drum; and
    a housing surrounding the drum as a watertight enclosure and defining an exit opening for the wrap tape to be dispensed from the drum onto a subsea pipeline during a repair or coating operation, wherein a leading edge of the wrap tape is attached to an anchor element that is arranged for attachment to the subsea pipeline being repaired or coated and the anchor element also serves as a watertight closure arranged to close the exit opening;
    wherein the drum is mounted to the housing for rotational movement relative to the housing to dispense the wrap tape through the exit opening on being unwound from the drum; and
    wherein the drum is mounted to the housing for longitudinal movement relative to the housing.

2. The cassette of claim 1, wherein the drum is reciprocally movable longitudinally relative to the housing.

3. The cassette of claim 2, comprising at least one sensor for sensing a limiting longitudinal position of the drum relative to the housing and for generating a reversal signal to reverse the direction of longitudinal movement.

4. The cassette of claim 3, wherein the or each sensor is mounted to the housing and detects contact with, or proximity of, a part of the drum.

5. The cassette of claim 2, comprising at least one sensor for sensing a limiting position of the wrap tape and for generating a reversal signal to reverse the direction of longitudinal movement.

6. The cassette of claim 1, comprising rotary and/or longitudinal drives acting between the housing and the drum.

7. The cassette of claim 6, wherein the or each drive is contained within the housing.

8. The cassette of claim 6, wherein the or each drive extends through a wall of the housing.

9. The cassette of claim 6, wherein the drum is rotatably mounted on a carriage that is movable longitudinally within the housing.

10. The cassette of claim 9, wherein a driven pinion mounted on the carriage is engaged with a rack extending longitudinally along the housing.

11. The cassette of claim 1, wherein the anchor element is arranged as a closure for the exit opening.

12. A subsea pipeline repair or coating machine comprising a wrap tape cassette as defined in claim 1.

13. The machine of claim 12, wherein the cassette is removable from the machine.

14. The machine of claim 12, wherein the cassette is integrated with the machine.

15. The machine of claim 12, comprising a mount for attachment to the pipeline and a cassette drive for acting between the mount and the housing of the cassette, to move the cassette relative to the pipeline during a repair or coating operation while wrap tape is being dispensed from the drum of the cassette onto the pipeline.

16. The machine of claim 15, wherein the drive comprises a rotary drive arranged to turn the cassette around the pipeline.

17. The machine of claim 15, wherein the drive comprises a linear drive arranged to move the cassette along the pipeline.

18. The machine of claim 17, wherein the linear drive is oriented relative to the mount to extend parallel to the pipeline and is movable on a circular path around the mount.

19. The machine of claim 15, comprising a control system acting on the cassette drive, the control system being configured to synchronise and control movement of the cassette around and along the pipeline.

20. The machine of claim 19, wherein the control system is configured also to synchronise and control movement of the drum of the cassette relative to the housing.

21. A wrap tape cassette for a subsea pipeline repair or coating machine, the cassette comprising:
a drum carrying a wrap tape; and
a housing defining an exit opening for the wrap tape to be dispensed from the drum onto a subsea pipeline during a repair or coating operation;
wherein a leading end of the wrap tape is attached to an anchor element that is arranged as a closure for the exit opening and, when moved from the exit opening, for attachment to the subsea pipeline being repaired or coated; and
wherein the housing surrounds the drum as a watertight enclosure and the anchor element also serves as a watertight closure arranged to close the exit opening.

22. The cassette of claim 21, wherein the anchor element is removably mounted to the housing.

23. The cassette of claim 21, wherein the anchor element is magnetically attachable to the pipeline.

24. The cassette of claim 21, wherein the anchor element has a concave-curved outer face.

25. The cassette of claim 21, wherein the housing supports a wrap initiation mechanism positioned to act on the anchor element to move the anchor element away from the housing.

26. The cassette of claim 25, wherein the wrap initiation mechanism comprises one or more actuators, each having an extensible rod that bears on the anchor element to move the anchor element.

27. The cassette of claim 26 and having a pivoting interface between the anchor element and the or each rod.

28. A subsea pipeline repair or coating machine comprising a wrap tape cassette as defined in claim 21.

29. A method of repairing or coating a subsea pipeline, the method comprising unwinding a wrap tape from a drum to dispense the wrap tape onto the subsea pipeline while effecting rotational movement of the drum relative to a housing of the drum, and while effecting longitudinal movement of the drum relative to the housing of the drum; the method further comprising initiating application of the wrap tape by attaching an anchor element to the subsea pipeline, a leading end of the wrap tape attached to the anchor element thereby being anchored to the subsea pipeline, and wherein the housing surrounds the drum as a watertight enclosure and the anchor element also serves as a watertight closure for an exit opening of the housing before being moved from the housing to the subsea pipeline.

30. The method of claim 29, comprising moving the drum longitudinally and reciprocally along the housing.

31. The method of claim 30, comprising sensing a limiting longitudinal position of the drum or of the exiting tape relative to the housing and, in response, reversing the longitudinal movement of the drum.

32. The method of claim 29, comprising moving the housing relative to the pipeline while dispensing the wrap tape onto the pipeline.

33. The method of claim 32, comprising turning the housing around the pipeline while dispensing the wrap tape onto the pipeline.

34. The method of claim 32, comprising moving the housing along the pipeline while dispensing the wrap tape onto the pipeline.

35. The method of claim 32, comprising synchronising and controlling movement of the housing relative to the pipeline and movement of the drum relative to the housing while dispensing the wrap tape onto the pipeline.

36. The method of claim 29, comprising pushing the anchor element from the housing toward the pipeline.

37. The method of claim 29, comprising:
holding the drum in a watertight housing to keep the wrap tape dry before a repair or coating operation; and
on initiating a repair or coating operation, opening the housing to flood the housing with water for curing a water-curable polymer on the wrap tape.

38. The method of claim 29, preceded by fitting the housing and drum to a pipeline repair or coating machine while the machine is underwater.

39. The method of claim 38, comprising replenishing the machine with wrap tape by interchanging the housing and drum.

40. A method of repairing or coating a subsea pipeline, the method comprising:
attaching an anchor element to the subsea pipeline, a leading end of a wrap tape attached to the anchor element thereby being anchored to the subsea pipeline; and
unwinding the wrap tape from a drum to dispense the wrap tape onto the subsea pipeline;
wherein the anchor element also serves as a watertight closure for an exit opening of a housing of the drum before being moved from the housing to the subsea pipeline, and wherein the housing surrounds the drum as a watertight enclosure.

41. The method of claim 40, comprising pushing the anchor element from the housing toward the pipeline.

42. The method of claim 40, comprising:
holding the drum in a watertight housing to keep the wrap tape dry before a repair or coating operation; and
on initiating a repair or coating operation, opening the housing to flood the housing with water for curing a water-curable polymer on the wrap tape.

43. The method of claim 40, preceded by fitting the housing and drum to a pipeline repair or coating machine while the machine is underwater.

44. The method of claim 43, comprising replenishing the machine with wrap tape by interchanging the housing and drum.

* * * * *